(12) United States Patent
Toshiyuki

(10) Patent No.: US 9,484,813 B2
(45) Date of Patent: Nov. 1, 2016

(54) BOOST CONVERTER CIRCUIT AND CONTROL METHOD THEREOF

(71) Applicant: TOYOTA JIDOSHA KABUSHIKI KAISHA, Toyota-shi, Aichi-ken (JP)

(72) Inventor: Ken Toshiyuki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 14/592,269

(22) Filed: Jan. 8, 2015

(65) Prior Publication Data

US 2015/0244261 A1 Aug. 27, 2015

(30) Foreign Application Priority Data

Feb. 27, 2014 (JP) ................................ 2014-037446

(51) Int. Cl.

| | |
|---|---|
| *G05F 1/56* | (2006.01) |
| *H02M 3/156* | (2006.01) |
| *H02M 3/158* | (2006.01) |
| *H02M 1/00* | (2006.01) |

(52) U.S. Cl.
CPC ........... *H02M 3/156* (2013.01); *H02M 3/1588* (2013.01); *H02M 2001/0032* (2013.01); *H02P 2201/09* (2013.01); *Y02B 70/1466* (2013.01); *Y02B 70/16* (2013.01)

(58) Field of Classification Search
CPC ............................................ H02M 2001/0032
USPC ......................................... 323/281–285, 351
See application file for complete search history.

(56) References Cited

U.S. PATENT DOCUMENTS

| | | | | |
|---|---|---|---|---|
| 7,692,417 | B2* | 4/2010 | Dagher | 323/285 |
| 7,868,595 | B1* | 1/2011 | Smith | 323/222 |
| 7,965,071 | B2 | 6/2011 | Saitoh | |
| 8,125,805 | B1* | 2/2012 | Melanson | 363/89 |
| 8,736,246 | B2* | 5/2014 | Yeh et al. | 323/285 |
| 2003/0095421 | A1* | 5/2003 | Kadatskyy et al. | 363/65 |
| 2003/0128556 | A1* | 7/2003 | Zhang | 363/21.06 |
| 2007/0109822 | A1* | 5/2007 | Kuan | 363/21.14 |
| 2013/0076317 | A1* | 3/2013 | Yeh et al. | 323/209 |

FOREIGN PATENT DOCUMENTS

| | | |
|---|---|---|
| JP | 2009-201247 A | 9/2009 |
| JP | 2009-261079 A | 11/2009 |
| JP | 2011-254646 A | 12/2011 |
| JP | 2012-200079 A | 10/2012 |

* cited by examiner

*Primary Examiner* — Adolf Berhane
*Assistant Examiner* — Nusrat Quddus
(74) *Attorney, Agent, or Firm* — Oliff PLC

(57) ABSTRACT

A boost converter includes an inductor configured to have one terminal connected with an input power source; a switching element configured to be connected between another terminal of the inductor and a reference potential terminal; a rectifier configured to be connected between the other terminal of the inductor and an output terminal; and a controller configured to boost a voltage of the input power source using the inductor by applying a duty drive to the switching element in a switching cycle so that a command value of a current to be flowing into the inductor is equivalent to an average value of a current flowing into the inductor during an off period during which the switching element is duty-off in the switching cycle, and to have the voltage output from the output terminal.

6 Claims, 4 Drawing Sheets

BOOST CONVERTER CIRCUIT AND CONTROL METHOD THEREOF

The disclosures herein generally relate to a boost converter and a control method thereof.

BACKGROUND

A boost converter has been known that boosts the voltage of an input power source by applying a duty drive to a switching element for switching cycles, and by using an inductor, to output the boosted voltage (see, for example, Patent Documents 1 and 2). This boost converter includes the inductor having one terminal connected with the input power source, the switching element connected between the other terminal of the inductor and the ground terminal, and a diode connected between the other terminal of the inductor and the output terminal of a load side.

In the boost converter, a controller controls the duty drive of the switching element based on the average value of a current flowing into the inductor during the switching cycle. Specifically, the controller applies the duty drive to the switching element, based on a duty command value calculated so that a command value for a current to be flowing into the inductor is equivalent to the average value of the current flowing into the inductor during the switching cycle.

When the switching element is turned on, the current flowing into the inductor from the input power source side does not flow to the load side via the diode, but flows to the ground terminal side via the switching element. While the switching element is on, the current flowing into the inductor gradually increases. Next, when the switching element is switched from on to off, the potential of the other terminal of the inductor rises from virtually zero to a level equivalent to the output voltage of the output terminal, and the current flowing into the inductor from the input power source side does not flow to the ground terminal side via the switching element, but flows to the load side via the diode. While the switching element is off, the current flowing into the inductor gradually decreases from a peak value taken when the switching element has been switched from on to off. Therefore, by repeating on and off of the switching element, the voltage of the input power source can be boosted to be output from the output terminal to the load side.

RELATED-ART DOCUMENTS

Patent Documents

[Patent Document 1] Japanese Laid-open Patent Publication No. 2009-201247
[Patent Document 2] Japanese Laid-open Patent Publication No. 2011-254646

Incidentally, a timing during which the current flowing from the input power source side into the inductor flows to the load side via the diode is an off duration during which the switching elements is off within the entire duration of the switching cycle. In this regard, electric charge that contributes to the output voltage change of the output terminal is that generated by the current flowing into the inductor during the off period of the switching element within the switching cycle. Therefore, if the change of the output current flowing to the load is sufficiently slower compared to the switching cycle, the output voltage change at the output terminal is determined by a time integral value of the current (electric charge) flowing into the inductor during the off period of the switching element within the switching cycle, which is proportional to the average value of the current flowing into the inductor during the off period of the switching element.

In a continuous current mode in which there is no duration where the current flowing into the inductor becomes zero during the entire period of a switching cycle, namely, a state continues in which the current is kept flowing into the inductor, the average value of the current flowing into the inductor during the entire period of a switching cycle is equivalent to the average value of the current flowing into the inductor during the off period of the switching element within the switching cycle. On the other hand, in a discontinuous current mode in which there is a duration where the current flowing into the inductor becomes zero during the entire period of a switching cycle, the average value of the current flowing into the inductor during the entire period of a switching cycle is not equivalent to the average value of the current flowing into the inductor during the off period of the switching element within the switching cycle.

In this regard, as in the boast converter described in Patent Document 1 or 2, in a control method where a duty drive of a switching element is executed based on the average value of the current flowing into the inductor during the entire period of a switching cycle, in the continuous current mode, linearity is maintained between the average value of the inductor current and the output voltage change during the entire period of a switching cycle. Therefore, the inductor current command value can be set as a current command value that is inherently required. However, on the other hand, in the discontinuous current mode, the linearity is not maintained between the average value of the inductor current and the output voltage change during the entire period of a switching cycle. Therefore, an error difference is generated between the inductor current command value, and the current command value that is inherently required.

Therefore, if the duty drive of the switching element is executed based on the average value of the current flowing into the inductor during the entire period of the switching cycle, without making a distinction between the continuous current mode and the discontinuous current mode, the duty command value for the current command value is discontinuous between the continuous current mode and the discontinuous current mode. Therefore, stability is reduced for the output voltage when the continuous current mode and the discontinuous current mode are switched.

The present invention provides a boost converter and a control method thereof in which stability of the output voltage is improved when the continuous current mode and the discontinuous current mode are switched.

SUMMARY

According to at least one embodiment of the present invention, a boost converter includes an inductor configured to have one terminal connected with an input power source; a switching element configured to be connected between another terminal of the inductor and a reference potential terminal; a rectifier configured to be connected between the other terminal of the inductor and an output terminal; and a controller configured to boost a voltage of the input power source using the inductor by applying a duty drive to the switching element in a switching cycle so that a command value of a current to be caused to flow into the inductor is equivalent to an average value of a current flowing into the inductor during an off period during which the switching element is duty-off in the switching cycle, and to have the voltage output from the output terminal.

According to at least one embodiment of the present invention, there is a control method of a boost converter including an inductor configured to have one terminal connected with an input power source, a switching element configured to be connected between another terminal of the inductor and a reference potential terminal, and a rectifier configured to be connected between the other terminal of the inductor and an output terminal, the method including boosting a voltage of the input power source using the inductor by applying a duty drive to the switching element in a switching cycle so that a command value of a current to be flowing into the inductor is equivalent to an average value of a current flowing into the inductor during an off period during which the switching element is duty-off within the switching cycle; and having the voltage output from the output terminal.

According to at least one embodiment of the present invention, stability of the output voltage is improved when switching between the continuous current mode and the discontinuous current mode.

DESCRIPTION OF EMBODIMENTS

In the following, embodiments of a boost converter will be described with reference to the drawings according to the present invention.

Figure 1:
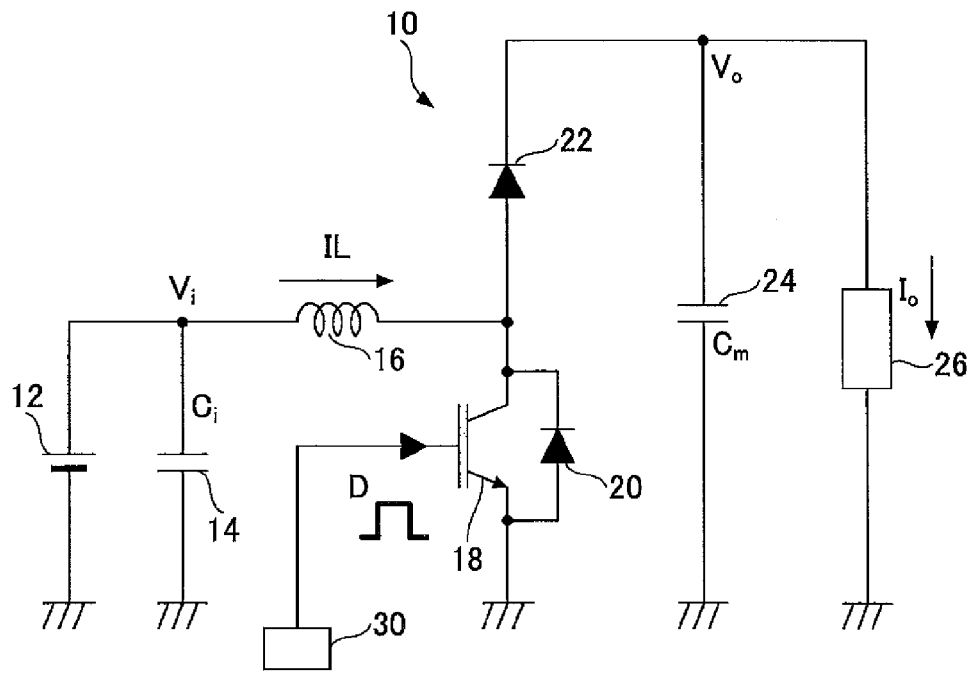
FIG. 1 is a circuit configuration diagram of a boost converter according to an embodiment of the present invention.

FIG. 1 illustrates a circuit configuration diagram of a boost converter 10 according to an embodiment of the present invention. The boost converter 10 in the present embodiment is a chopper-type DC-DC converter that boosts and outputs the voltage of an input power source. The boost converter 10 is used for, for example, driving a motor for traveling, and/or controlling a power source of an electric power steering system which is built in a hybrid vehicle or an electric vehicle.

As shown in FIG. 1, the boost converter 10 includes an input power source 12, a filter capacitor 14, an inductor 16, a switching element 18, diodes 20 and 22, and a smoothing capacitor 24. The boost converter 10 is a circuit that executes a boost operation to boost a DC voltage (for example, 200 V or 12 V) $V_i$ output by the input power source 12, up to a desired DC voltage (for example, 650 V or 42 V), by executing a duty drive where the switching element 18 is repeatedly turned on and off for predetermined switching cycles T.

The input power source 12 is a power source such as an in-vehicle battery that outputs the predetermined voltage $V_i$. The filter capacitor is connected in parallel with the input power source 12 between the positive-polarity terminal and the negative-polarity terminal (ground terminal). The filter capacitor 14 is a capacitor to stabilize the voltage $V_i$ output by the input power source 12. The filter capacitor 14 has a predetermined capacitance $C_i$.

The inductor 16 is configured to have one of its terminals connected with the positive-polarity terminal of the input power source 12, and the other of its terminals connected with the ground terminal via the switching element 18, which is also connected with the output terminal via the diode 22. The inductor 16 operates to have the boost converter 10 charge or discharge power when the boost converter 10 executes a boost operation. The inductor 16 has a predetermined inductance L.

The switching element 18 is a power semiconductor element such as an insulated-gate bipolar transistor (IGBT). Note that the switching element 18 may be a MOSFET. The switching element 18 is configured to have the collector connected with the other terminal of the inductor 16, and the emitter connected with the ground terminal. The switching element 18 is turned on and off, following a duty command value D from the controller 30, which is input into the gate.

The diode 20 is connected in parallel with the switching element 18 between the collector and emitter. Specifically, the diode 20 is configured to have the anode connected with the emitter of the switching element 18 and the ground terminal, and the cathode connected with the collector of the switching element 18 and the other terminal of the inductor 16. The diode 20 is formed on the same semiconductor substrate as the switching element 18. The diode 20 is a rectifier that allows a current flowing only from the emitter side to the collector side of the switching element 18.

The diode 22 is configured to have the anode connected with the other terminal of the inductor 16 and the cathode of the diode 20, and the cathode connected with the output terminal. The diode 22 is a rectifier that allows a current flowing only from the other terminal side of the inductor 16 to the output terminal side.

Note that the diode 22 may be connected in parallel with another switching element (not shown), which would be another power semiconductor element to be paired with the above switching element 18. In this case, the switching element 18 and the diode 20 constitute a lower arm, and the diode 22 and the other switching element connected in parallel with the diode 22 constitute an upper arm. Also, the other switching element connected in parallel with the diode 22 may be turned off when the boost converter 10 executes a boost operation, or may be applied with a duty drive in a reverse phase with respect to the switching element 18. Furthermore, the other switching element connected in parallel with the diode 22 may be turned on when the boost converter 10 executes a step-down operation.

The smoothing capacitor 24 is connected between the output terminal and the ground terminal. The smoothing capacitor 24 is a capacitor to smooth the voltage (output voltage) $V_o$ generated at the output terminal. The smoothing capacitor 24 has a predetermined capacitance $C_m$. A load 26, such as an electric motor, is connected in parallel with the smoothing capacitor 24. Namely, the load 26 is connected between the output terminal and the ground terminal. The load 26 is driven to operate by a current $I_o$ having the output voltage $V_o$ supplied from the output terminal side.

In the boost converter 10, when the switching element 18 is turned on by a duty drive following the duty command value D from the controller 30, the current flows through the positive-polarity terminal of the input power source 12, the inductor 16, the switching element 18, and the ground terminal in this order. Namely, the current flowing from the input power source 12 to the inductor 16 does not flow to the output terminal side having a higher potential via the diode 22, but flows to the ground terminal side via the switching element 18. During an on period of the switching element 18, the current IL flowing from the input power supply side 12 into the inductor 16 gradually increases while time passes. At this moment, the increased amount in time of the current IL is $V_i/L$.

Next, when the switching element 18 is switched from a duty-on state to a duty-off state, the potential of the other terminal side of the inductor 16 rises from virtually zero to a level equivalent to the output voltage $V_o$ of the output terminal, and the current flows through the positive-polarity terminal of the input power source 12, the inductor 16, the diode 22, and the output terminal in this order. Namely, the current flowing from the input power source 12 into the inductor 16 does not flow to the ground terminal side via the switching element 18, but flows to the output terminal side having a higher potential via the diode 22. During an off period of the switching element 18, the current IL flowing from the input power supply side 12 into the inductor 16 gradually decreases from a peak value of the current IL taken when the switching element 18 has been switched from on to off, while time passes. At this moment, the decreased amount in time of the current IL is $(V_o-V_i)/L$.

After that, the switching element 18 repeats to take duty-on and duty-off states for the predetermined switching cycles T, which makes the current IL flowing from the input power source 12 into the inductor 16 repeatedly increase and decrease.

In this way, in the present embodiment, a duty-on state of the switching element 18 makes the current IL flowing from the input power source 12 into the inductor 16 increase, a switching of the switching element 18 from a duty-on state to a duty-off state makes the potential of the other terminal side of the inductor 16 rise from virtually zero to a level equivalent to the output voltage $V_o$ of the output terminal, and a duty-off state of the switching element 18 makes the current IL flowing from the input power source 12 into the inductor 16 flow to the output terminal side while decreasing from a peak value.

Such a duty drive of the switching element 18 can boost the voltage $V_i$ from the input power source 12, to be output as the output voltage $V_o$ from the output terminal. Also, during an off period of the switching element 18 in a duty-off state, the current IL flowing from the input power source 12 into the inductor 16 flows to the output terminal side. Therefore, during the off period, by the electric charge of the current IL, the smoothing capacitor 24 can be charged, or the power can be supplied to the load 26. Note that, during an on period of the switching element 18 in a duty-on state, although the current IL flowing from the input power source 12 into the inductor 16 does not flow to the output terminal side, the power supply to the load 26 is maintained as the smoothing capacitor 24 is being discharged. The current $I_o$ supplied to the load 26 is maintained to be virtually constant regardless of the on or off period of the switching element 18.

Therefore, according to the present embodiment, by applying the duty drive (so-called "one-side element drive") to a single switching element 18, the input voltage $V_i$ of the input power source 12 can be boosted up to a desired voltage. In this regard, the boost converter 10 in the present embodiment does not need to provide a dead time for the boost operation, which would be required in a configuration that applies a duty drive to the switching element of an upper arm and the switching element of a lower arm by respective phases reverse to each other, to prevent the upper and lower arms from being turned on at the same time. Therefore, the boost converter 10 in the present embodiment can efficiently implement the boost operation, and can make the switching frequency higher.

Next, with reference to FIGS. 2 to 7, a method will be described that calculates a duty command value used when the controller 30 applies a duty drive to the switching element 18 in the boost converter 10 in the present embodiment.

Figure 2:
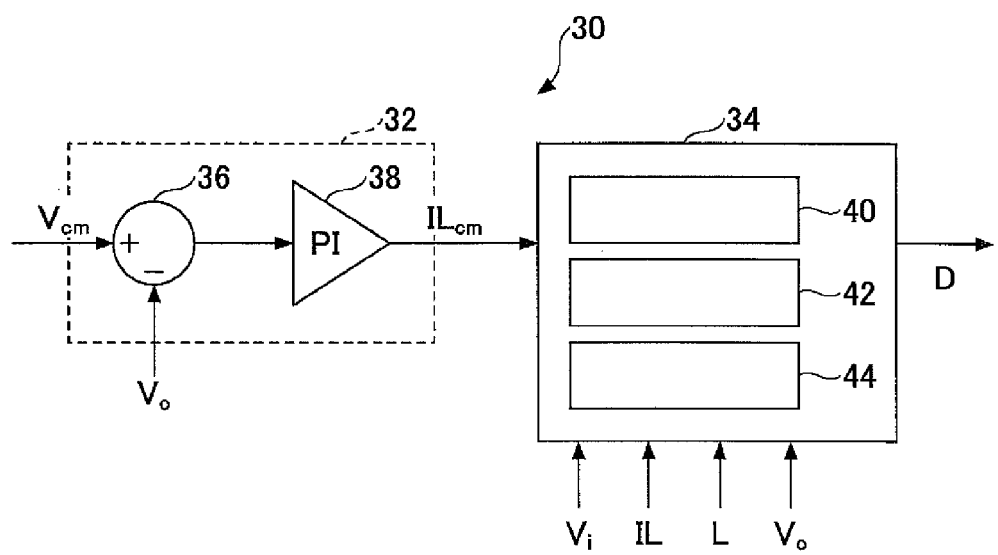
FIG. 2 is a configuration diagram of a controller included in a boost converter according to the embodiment.
Figure 3:
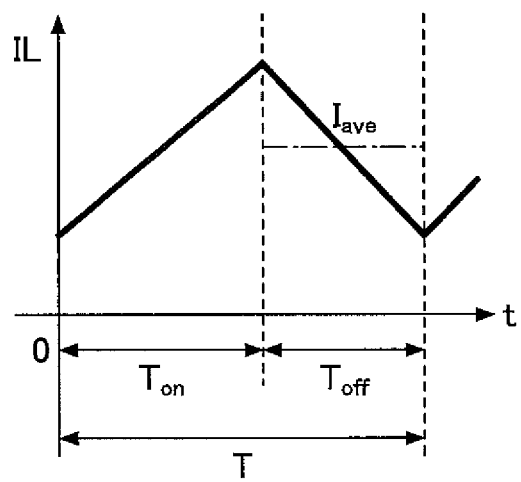
FIG. 3 is a diagram illustrating an example of a time waveform of a current IL flowing into an inductor in the continuous current mode.
Figure 4:
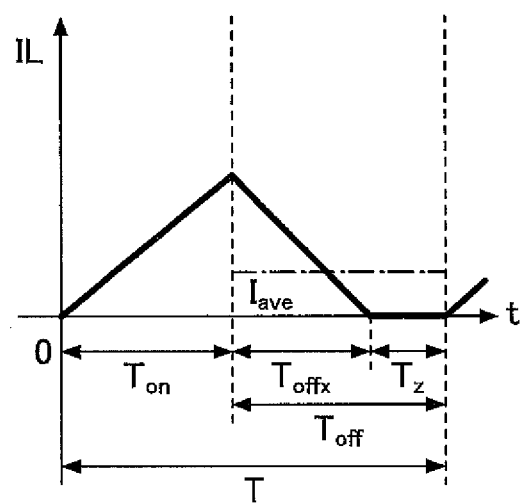
FIG. 4 is a diagram illustrating an example of a time waveform of a current IL flowing into an inductor in the discontinuous current mode.
Figure 5:
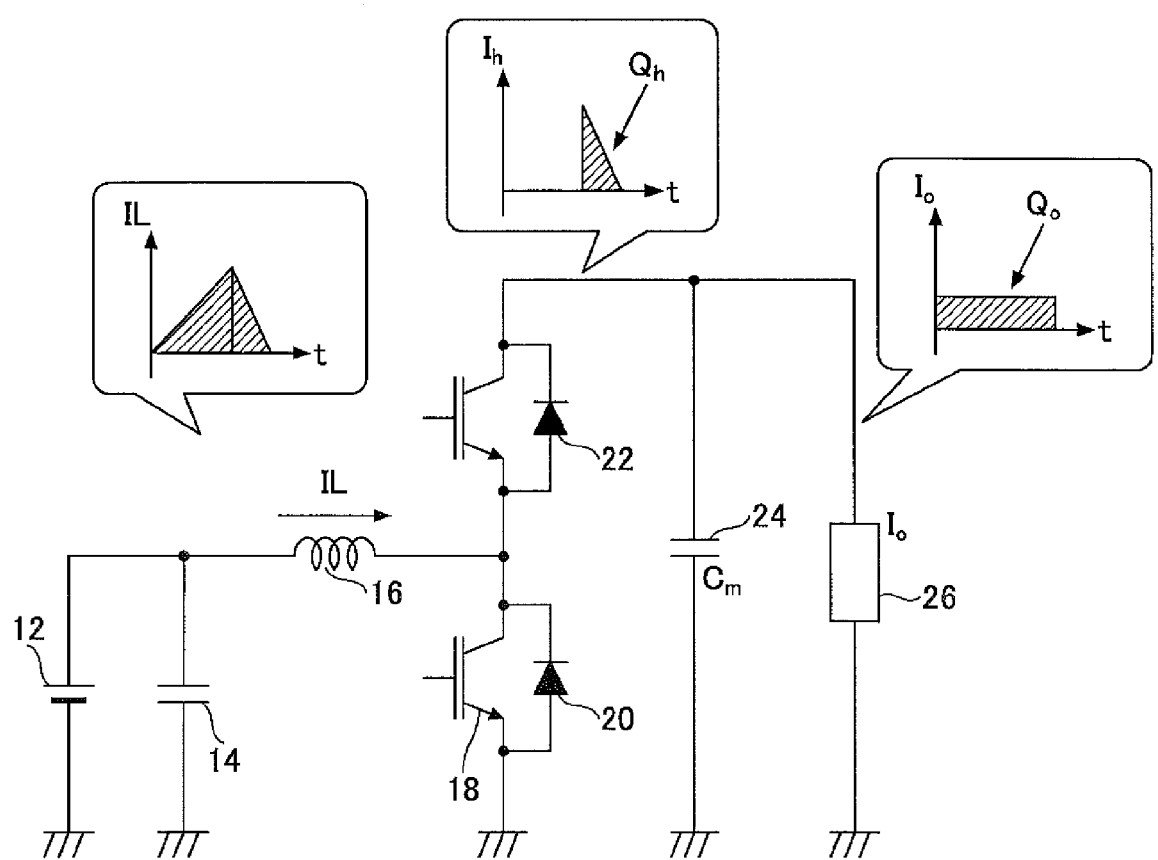
FIG. 5 is a diagram illustrating a relationship between a configuration of a boost converter and time waveforms of currents IL, $I_h$, and $I_o$ flowing at respective points according to the embodiment.
Figure 6:
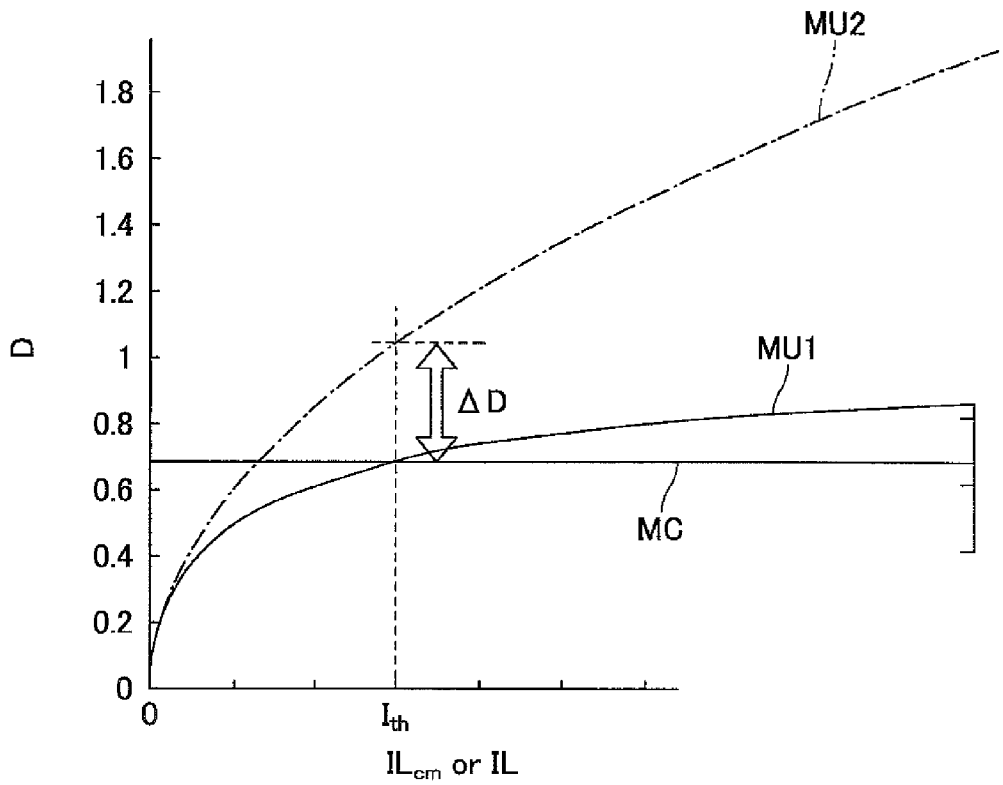
FIG. 6 is a diagram illustrating relationships between the inductor current command value $IL_{cm}$ and the duty command value D in the continuous current mode and the discontinuous current mode, respectively, in a boost converter according to the embodiment.
Figure 7:
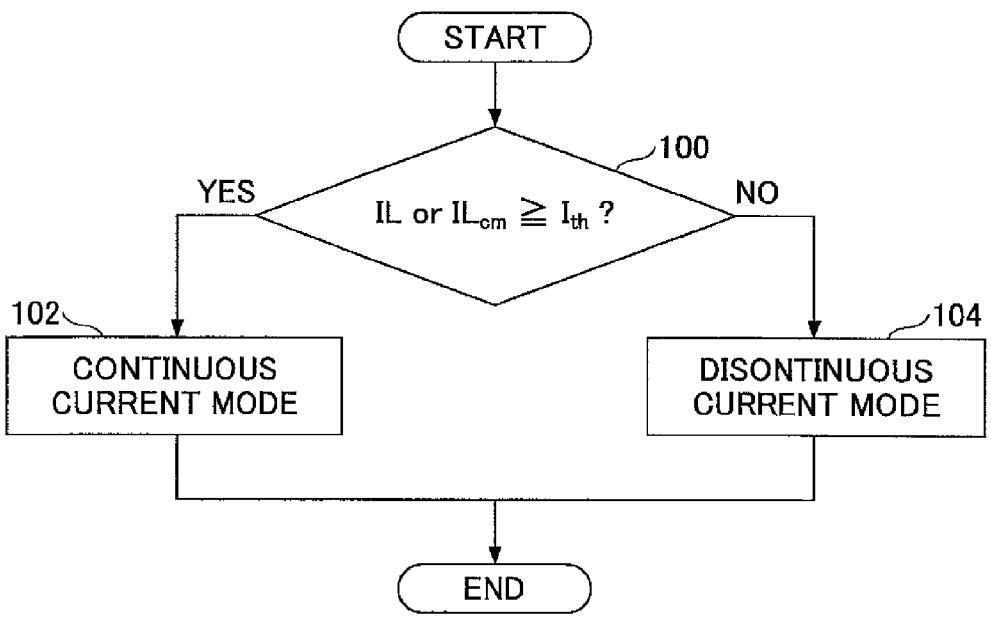
FIG. 7 is a flowchart of an example of a control routine executed to make a distinction between the continuous current mode and the discontinuous current mode to determine the mode in a boost converter according to the embodiment.

FIG. 2 illustrates a configuration diagram of the controller 30 included in the boost converter 10 in the present embodiment. FIG. 3 illustrates a diagram representing an example of a time waveform of a current IL flowing into the inductor 16 in the continuous current mode. FIG. 4 illustrates a diagram representing an example of a time waveform of a current IL flowing into the inductor 16 in the discontinuous current mode. FIG. 5 illustrates a diagram representing a relationship between a configuration of the boost converter 10 and time waveforms of currents IL, $I_h$, and $I_o$ flowing at respective points according to the present embodiment. FIG. 6 illustrates a diagram representing relationships between the inductor current command value $IL_{cm}$ and the duty command value D in the continuous current mode and the discontinuous current mode, respectively, in the boost converter 10 according to the present embodiment. Also, FIG. 7 illustrates a flowchart of an example of a control routine executed to make a distinction between the continuous current mode and the discontinuous current mode to determine the mode in the boost converter 10 according to the present embodiment.

Note that, in FIG. 6, a relationship between the inductor current command value $IL_{cm}$ and the duty command value D in the continuous current mode is represented by a solid line MC. Also, a relationship between the inductor current command value $IL_{cm}$ and the duty command value D in the discontinuous current mode is represented by a solid curve MU1, as implemented in the boost converter 10 in the present embodiment. Furthermore, a relationship between the inductor current command value $IL_{cm}$ and the duty command value D in the discontinuous current mode in a contrastive example is represented by a dashed-dotted curve MU2, which is implemented in the contrastive example that applies a duty drive to a switching element 18 based on the average value of the current flowing into an inductor 16 during the entire period of a switching cycle.

The controller 30 is mainly configured with a microcomputer, and includes a voltage controller 32 and a current controller 34. The voltage controller 32 receives as input a target output voltage $V_{cm}$ to be output from the output terminal by the boost converter 10 (referred to as the "output voltage target value" below), and also receives as input an actual monitor value of the output voltage $V_o$ generated at the output terminal (referred to as the "output voltage monitor value $V_o$" below). Note that the output voltage target value $V_{cm}$ may be determined in advance.

The voltage controller 32 includes a differentiator 36 and PI controller 38. The differentiator 36 calculates a difference between the output voltage target value $V_{cm}$ and the output voltage monitor value $V_o$ (or the square of the difference) received as input. Also, based on the difference calculated by the differentiator 36, the PI controller 38 sets, by PI control, a command value of the current to be flowing into the inductor (referred to as the "inductor current command value" below) $IL_{cm}$. For example, when the output voltage monitor value $V_o$ is smaller than the output voltage target value $V_{cm}$, the inductor current command value $IL_{cm}$ is set to a greater value.

Note that the inductor current command value $IL_{cm}$ set as above is maintained to the same value for a sufficiently long period compared to the switching cycle T. Also, the voltage controller 32 may include a PID controller instead of the PI controller 38, and may set the inductor current command value $IL_{cm}$ by PID control based on the difference calculated by the differentiator 36.

The output of the voltage controller 32 is connected with the input of the current controller 34. The voltage controller 32 outputs the inductor current command value $IL_{cm}$, which has been set based on the difference between the output voltage target value $V_{cm}$ and the output voltage monitor value $V_o$, to the current controller 34. Namely, the inductor current command value $IL_{cm}$ set by the voltage controller 32 is input into the current controller 34.

The current controller 34 also receives as input an actual monitor value of the current IL flowing into the inductor 16 (referred to as the "inductor current monitor value IL" below), and also receives as input the output voltage monitor value $V_o$ generated at the output terminal, the input voltage $V_i$ output by the input power source 12, and the inductance L of the inductor 16. Note that the inductance L may be determined in advance.

The current controller 34 includes a current mode determination unit 40, a control formula variation unit 42, and a drive unit 44. The current controller 34 calculates a duty command value D based on the input values, namely, the inductor current command value $IL_{cm}$, the inductor current monitor value IL, the output voltage monitor value $V_o$, the input voltage $V_i$, and the inductance L, as will be described in detail later. Note that the calculated duty command value D is maintained to be the same value for a sufficiently long period compared to the switching cycle T.

The output of the current controller 34 is connected with the gate of the switching element 18. The current controller 34 generates a gate signal that repeatedly takes the high level and the low level for the predetermined switching cycles T following the calculated duty command value D, and supplies the signal to the gate of the switching element 18, as the output of the controller 30. The switching element 18 is turned on and off based on the gate signal that follows the duty command value D from the controller 30, which is input into the gate.

In the boost converter 10, the current IL flowing into the inductor 16 changes depending on the duty ratio of the on and off of the switching element 18 (on period $T_{on}$/(on period $T_{on}$+off period $T_{off}$)). Specifically, the current IL is greater when the duty ratio is greater, and the current IL is smaller when the duty ratio is smaller.

Also, in the configuration where the input voltage $V_i$ is boosted up to a desired voltage by the so-called "one-side element drive", to be output from the output terminal as in the boost converter 10, there are two modes. One is the continuous current mode in which a state continues in that the current IL is kept flowing into the inductor 16 for the entire period of a cycle of the on and off switching of the switching element 18 (namely, the switching cycle T (=$T_{on}$+$T_{off}$)). The other is the discontinuous current mode in which there is a duration where the current IL flowing into the inductor 16 is zero within the entire period of a switching cycle.

When the duty ratio of the boost converter 10 is greater than or equal to a predetermined value, the current IL flowing into the inductor 16 is comparatively greater, and the mode is the continuous current mode. On the other hand, when the duty ratio of the boost converter 10 is less than a predetermined value, the current IL flowing into the inductor 16 is comparatively smaller, and the mode is the discontinuous current mode. In this regard, the continuous current mode and the discontinuous current mode are switched depending on whether the inductor current command value $IL_{cm}$ is greater than or equal to a predetermined value $I_{th}$. Note that the discontinuous current mode includes a period $T_{offx}$ during which the current flaws into the inductor 16, and a duration $T_z$ (=$T-T_{on}-T_{offx}$) during which the current that flows into the inductor 16 is zero.

In, the boost converter 10 in the present embodiment, to apply the duty drive to the switching element 18, the controller 30 has the current controller 34 calculate the duty command value D based on the inductor current command value $IL_{cm}$ from the voltage controller 32. The current controller 34 calculates the duty command value D for the switching element 18 so that the inductor current command value $IL_{cm}$ is equivalent to the average value of the current IL flowing into the inductor 16 during the off period $T_{off}$, during which the switching element 18 is duty-off in the switching cycle T.

Note that a timing during which the current IL flowing from the input power source 12 into the inductor 16 flows to the output terminal side via the diode 22 is only the off period $T_{off}$ during which the switching element 18 is off in the switching cycle T. Namely, the current IL flowing into the inductor 16 flows to the output terminal as the current $I_h$ during the off period $T_{off}$ of the switching element 18. In this regard, the electric charge that contributes to the output voltage change $\Delta V_o$ generated at the output terminal is that generated by the current IL flowing into the inductor 16 (namely, the output terminal side current $I_h$) during the off period $T_{off}$ of the switching element 18 in the switching cycle T.

Therefore, if the output current $I_o$ flowing to the load 26 changes sufficiently slower compared to the switching cycle T, the output voltage change $\Delta V_o$ is determined by a time integral value of the current IL flowing into the inductor 16 during the off period $T_{off}$ of the switching element within the switching cycle (namely, the time integral value $Q_h$ of the current $I_h$), which is proportional to the average value $I_{ave}$ of the current IL flowing into the inductor 16 (=$I_h$) during the off period $T_{off}$ of the switching element 18 ($\Delta V_o=(Q_h-Q_o)/C_m$). Here, $Q_h$ is the electric charge supplied from the inductor 16 side to the output terminal side, which satisfies $Q_h=I_{ave} \cdot T_{off}$. Also, $Q_o$ is the electric charge supplied to the load 26.

In the continuous current mode, the current IL flowing into the inductor 16 during the off period $T_{off}$ of the switching element 18 continuously flows to the output terminal side from the beginning to the end of the off period $T_{off}$, and the current IL proportionally decreases by the slope ($V_o-V_i$)/L during the off period $T_{off}$. In this case, the average value $I_{ave}$ of the current IL flowing into the inductor 16 during the off period $T_{off}$ of the switching element 18 is $I_p/2$, which is the median of the initial value and final value of the current IL during the off period $T_{off}$.

On the other hand, in the discontinuous current mode, although the current IL flowing into the inductor 16 flows to the output terminal side during the off period $T_{off}$ of the switching element 18, the timing during which the current IL actually flows into the inductor 16 is only the period $T_{offx}$ where the current IL is greater than zero. Therefore, the current IL flows from the inductor 16 side to the output terminal side, only during the period $T_{offx}$. In this case, the average value $I_{ave}$ of the current IL flowing into the inductor 16 during the off period $T_{off}$ of the switching element 18 is $I_{ave}=(I_p/2)\cdot(T_{offx}/T_{off})$ where $I_p/2$ is the median of the initial value and final value of the current IL during the off period $T_{off}$, which is multiplied by $T_{offx}/T_{off}$ to obtain $I_{ave}$.

Therefore, assuming that all the electric charge supplied from the inductor 16 side to the output terminal side flows to the load 26 side, in the continuous current mode, the electric charge $Q_o^*$ supplied to the load 26 per switching cycle T (one cycle) is $T_{off}\cdot I_p/2$, whereas in the discontinuous current mode, the electric charge $Q_o^*$ supplied to the load 26 per switching cycle T is $T_{offx}\cdot I_p/2$.

Thereupon, when calculating the duty command value D (=Ton/T=1-$T_{off}$/T) for the switching element 18, the current controller 34 of the controller 30 controls the inductor current command value $IL_{cm}$ to be equivalent to the average value of the current IL flowing into the inductor 16 during the off period $T_{off}$ where the switching element 1B is duty-off in the switching cycle T, following the next formula (1). In the continuous current mode, since $Q_o^*=T_{off}\cdot I_p/2$ is satisfied as described above, the current controller 34 executes the control following the next formula (2). On the other hand, in the discontinuous current mode since $Q_o^*=T_{offx}\cdot I_p/2$ is satisfied as described above, the current controller 34 executes the control following the next formula (3).

$$IL_{cm}\cdot(1-D)=Q_o^*/T=I_o^* \tag{1}$$

$$IL_{cm}\cdot(1-D)=(I_p/2)\cdot T_{off}/T \tag{2}$$

$$IL_{cm}\cdot(1-D)=(I_p/2)\cdot T_{offx}/T \tag{3}$$

Specifically, the current controller 34 first has the current mode determination unit 40 determine whether the present mode is the continuous current mode or the discontinuous current mode based on the inductor current monitor value IL received as input, or the inductor current command value $IL_{cm}$ from the voltage controller 32 (Steps 100 to 104).

Depending on whether the inductor current monitor value IL is greater than or equal to the predetermined threshold $I_{th1}$, the continuous current mode and the discontinuous current mode are switched; if IL≥$I_{th1}$ is satisfied, the continuous current mode is set; or if IL≥$I_{th1}$ is not satisfied, the discontinuous current mode is set. Also, depending on whether the inductor current monitor value IL is greater than or equal to the predetermined threshold $I_{th2}$, the continuous current mode and the discontinuous current mode are switched; if IL≥$I_{th2}$ is satisfied, the continuous current mode is set; or if $IL_{cm}$<$I_{th2}$ is satisfied, the discontinuous current mode is set.

The current controller 34 has the current mode determination unit 40 determine whether the inductor current monitor value IL received as input is greater than or equal to the predetermined threshold $I_{th1}$, or determine whether the input inductor current command value $IL_{cm}$ is greater than or equal to the predetermined threshold $I_{th2}$ (Step 100). Then, if determining that IL≥$I_{th1}$ is satisfied or $IL_{cm}$≥$I_{th2}$ is satisfied, the current controller 34 determines that the present mode is the continuous current mode, and executes the following operation for the continuous current mode (Step 102). On the other hand, if determining that IL≥$I_{th1}$ is not satisfied or $IL_{cm}$<$I_{th2}$ is satisfied, the current controller 34 determines that the present mode is the discontinuous current mode, and executes the following operation for the discontinuous current mode (Step 104).

Specifically, after having completed the mode determination as described above, depending on the mode determination result, the current controller 34 has the control formula variation unit 42 change a control formula between formula (6) and formula (7) below which calculate the duty command value D. Namely, the control formula variation unit calculates the duty command value D by the control formula (6) below in the continuous current mode, or by the control formula (7) below in the discontinuous current mode. Note that, in the discontinuous current mode, the difference between the initial value and final value (zero) of the current IL during the off period $T_{off}$ of the switching element 18 is equivalent to the difference between the initial value (zero) and final value of the current IL during the on period Ton of the switching element 18. Therefore, in the discontinuous current mode, since next formulas (4) and (5) are satisfied, the duty command value D is obtained by formula (3) with formula (4) and formula (5) substituted.

$$I_p = (V_i/L)\cdot D\cdot T \tag{4}$$

$$T_{offx} = L\cdot I_p/(V_o - V_i) = V_i\cdot D\cdot T/(V_o - V_i) \tag{5}$$

$$D = \frac{(L(IL_{cm} - IL)/T - V_i + V_0)}{V_o} \tag{6}$$

$$D = \frac{-IL_{cm}L(V_0 - V_i) + \sqrt{(IL_{cm}L(V_0 - V_i))^2 + 2V_i^2 TIL_{cm}L(V_o - V_i)}}{V_i^2 T} \tag{7}$$

The current controller 34 has the drive unit 44 generate a gate signal that repeatedly takes the high-level and the low-level for the predetermined switching cycles T based on the duty command value D calculated as described above, to supply the generated signal to the gate of the switching element 18. When the switching element 18 has the duty drive applied following the duty command value D, in either the continuous current mode or the discontinuous current mode, the inductor current command value $IL_{cm}$ is equivalent to the average value of the current IL flowing into the inductor 16 during the off period $T_{off}$ where the switching element 18 is duty-off in the switching cycle T.

Specifically, in the continuous current mode, the inductor current command value $IL_{cm}$ is equivalent to the average value of the current IL per off period $T_{off}$. Here, the current IL flows into the inductor 16 throughout the entire period of the off period $T_{off}$ in one switching cycle T. Also, in the discontinuous current mode, the inductor current command value $IL_{cm}$ is equivalent to the average value of the current IL per off period $T_{off}$. Here, the current IL flows into the inductor 16 during only a partial period $T_{offx}$ of the off period $T_{off}$ in one switching cycle T.

Thus, by the above drive control of the switching element 18, in the continuous current mode and the discontinuous current mode, the inductor current command value $IL_{cm}$ is equivalent to the average value of the current during the off period $T_{off}$ where the current flows from the inductor 16 side to the output terminal side via the diode 22. Therefore, when the continuous current mode and the discontinuous current mode are switched ($IL_{cm}=I_{th}$) the duty command value D for the inductor current command value $IL_{cm}$ can avoid being discontinuous due to a gap ΔD that would be generated in the duty command value D (see FIG. 6 for the comparison between the discontinuous current mode shown by the dashed-dotted curve, and the continuous current mode). Consequently, the duty command value D for the inductor current command value $IL_{cm}$ is continuous (see FIG. 6 for the comparison between the discontinuous current mode shown by the solid curve, and the continuous current mode).

The time integral value of the current (electric charge) that flows from the inductor 16 side to the output terminal side via the diode 22 during the off period $T_{off}$ of the switching element contributes to the output voltage change of the output terminal, and the average value of the current and the output voltage change have a proportional relationship. In this regard, according to the present embodiment, in either the continuous current mode or the discontinuous current mode, the linearity between the inductor current command value $IL_{cm}$ and the output voltage change of the output terminal can be secured. Therefore, it is possible to prevent the inductor current command value $IL_{cm}$ from deviating from a current command value inherently required for boosting by the boost converter 10.

Therefore, when boosting the voltage of the input power source 12 to be output, the boost converter 10 in the present embodiment can suppress generation of a ripple in the output voltage of the output terminal when the continuous current mode and the discontinuous current mode are switched, and can improve stability of the output voltage.

Note that, in the above embodiments, the diode 22 is an example of a "rectifier". The current mode determination unit 40 of the current controller 34 is an example of a "current mode determination unit". The control formula variation unit 42 of the current controller 34 is an example of a "control formula variation unit". And the drive unit 44 of the current controller 34 is an example of a "drive unit".

The present application is based on Japanese Priority Application No. 2014-037446, filed on Feb. 27, 2014, the entire contents of which are hereby incorporated by reference.

What is claimed is:

1. A boost converter comprising:
an inductor configured to have one terminal connected with an input power source;
a switching element configured to be connected between another terminal of the inductor and a reference potential terminal;
a rectifier configured to be connected between the other terminal of the inductor and an output terminal; and
a controller configured to boost a voltage of the input power source using the inductor by applying a duty drive to the switching element in a switching cycle so that a command value of a current to be flowing into the inductor is equivalent to an average value of a current flowing into the inductor during an off period during which the switching element is duty-off in the switching cycle, and to have the voltage output from the output terminal.

2. The boost converter as claimed in claim 1, wherein the controller includes
a current mode determination unit configured to determine whether a present mode is a continuous current mode in which a state continues where the current flows into the inductor throughout an entire period of the switching cycle, or a discontinuous current mode in which a duration is included where a current flows into the inductor becomes zero within the switching cycle;
a control formula variation unit configured to change a control formula for calculating a duty command value used for applying the duty drive to the switching element depending on a determination result by the current mode determination unit; and
a drive unit configured to apply the duty drive to the switching element based on the duty command value calculated by the control formula changed by the control formula variation unit.

3. The boost converter as claimed in claim 2, wherein the current mode determination unit determines the present mode based on whether the current command value or a monitor value of the current flowing into the inductor is greater than or equal to a predetermined threshold.

4. The boost converter as claimed in claim 2, wherein the control formula variation unit changes the control formula to a formula (A) below when the current mode determination unit determines that the present mode is the continuous current mode, or changes the control formula to a formula (B) below when the current mode determination unit determines that the present mode is the discontinuous current mode, $$D = \frac{(L(IL_{cm} - IL)/T - V_i + V_0)}{V_o} \quad (A)$$

$$D = \frac{-IL_{cm}L(V_0 - V_i) + \sqrt{(IL_{cm}L(V_0 - V_i))^2 + 2V_i^2 TIL_{cm}L(V_o - V_i)}}{V_i^2 T} \quad (B)$$

where D represents the duty command value, $IL_{cm}$ represents the current command value, L represents an inductance of the inductor, IL represents the monitor value of the current flowing into the inductor, T represents the switching cycle, $V_i$ represents the voltage of the input power source, and $V_o$ represents a voltage of the output terminal.

5. The boost converter as claimed in claim 1, wherein the rectifier is a diode to allow a current flowing from the other terminal of the inductor to the output terminal.

6. A control method of a boost converter including
an inductor configured to have one terminal connected with an input power source,
a switching element configured to be connected between another terminal of the inductor and a reference potential terminal, and
a rectifier configured to be connected between the other terminal of the inductor and an output terminal,
the method comprising:
boosting a voltage of the input power source using the inductor by applying a duty drive to the switching element in a switching cycle so that a command value of a current to be flowing into the inductor is equivalent to an average value of a current flowing into the inductor during an off period during which the switching element is duty-off within the switching cycle; and
having the voltage output from the output terminal.

* * * * *